United States Patent [19]
Landa

[11] 4,412,383
[45] Nov. 1, 1983

[54] CABLE DRIVEN PLOTTER

[76] Inventor: Benzion Landa, 10045-118 St., Apt. 206, Edmonton, Alberta, Canada, T5K 1Y1

[21] Appl. No.: 292,723

[22] Filed: Aug. 13, 1981

[51] Int. Cl.³ .......................... G01B 5/03; G01B 7/03
[52] U.S. Cl. ...................................... 33/1 M; 33/189
[58] Field of Search ........................ 33/1 M, 26, 189

[56] References Cited
U.S. PATENT DOCUMENTS

| | | | |
|---|---|---|---|
| 2,422,025 | 6/1947 | Luck | 33/1 M |
| 2,706,855 | 4/1955 | White, Jr. | 33/1 M |
| 2,718,061 | 9/1955 | Omberg et al. | 33/1 M |
| 3,492,421 | 1/1970 | Cameron | 33/1 M |
| 3,553,842 | 1/1971 | Gerber et al. | 33/1 M |
| 3,564,533 | 2/1971 | Linn | 33/1 M |
| 3,665,608 | 5/1972 | Stockebrand | 33/1 M |
| 4,133,111 | 1/1979 | Logan | 33/1 M |
| 4,272,892 | 6/1981 | Rose | 33/1 M |

Primary Examiner—Richard R. Stearns
Attorney, Agent, or Firm—Shenier & O'Connor

[57] ABSTRACT

A cable driven plotter. One end of a first and a second cable is pivotally connected to a marking device. The cables extend over respective guide pulleys located at separated fixed points and are wound around respective motor driven take-up reels to which the respective other ends are fixed. One end of a third cable is connected to the marking device. The other end is wound around and fixed to a spring driven take-up reel secured to a carriage movable on a fixed horizontal track. The position of the marking device is changed in response to changes in the lengths of the first and second cables. The third cable serves to tension the first and second cables and support the marking device. Means are provided to limit the extent to which the respective lengths of said cables may be paid out or taken in.

5 Claims, 7 Drawing Figures

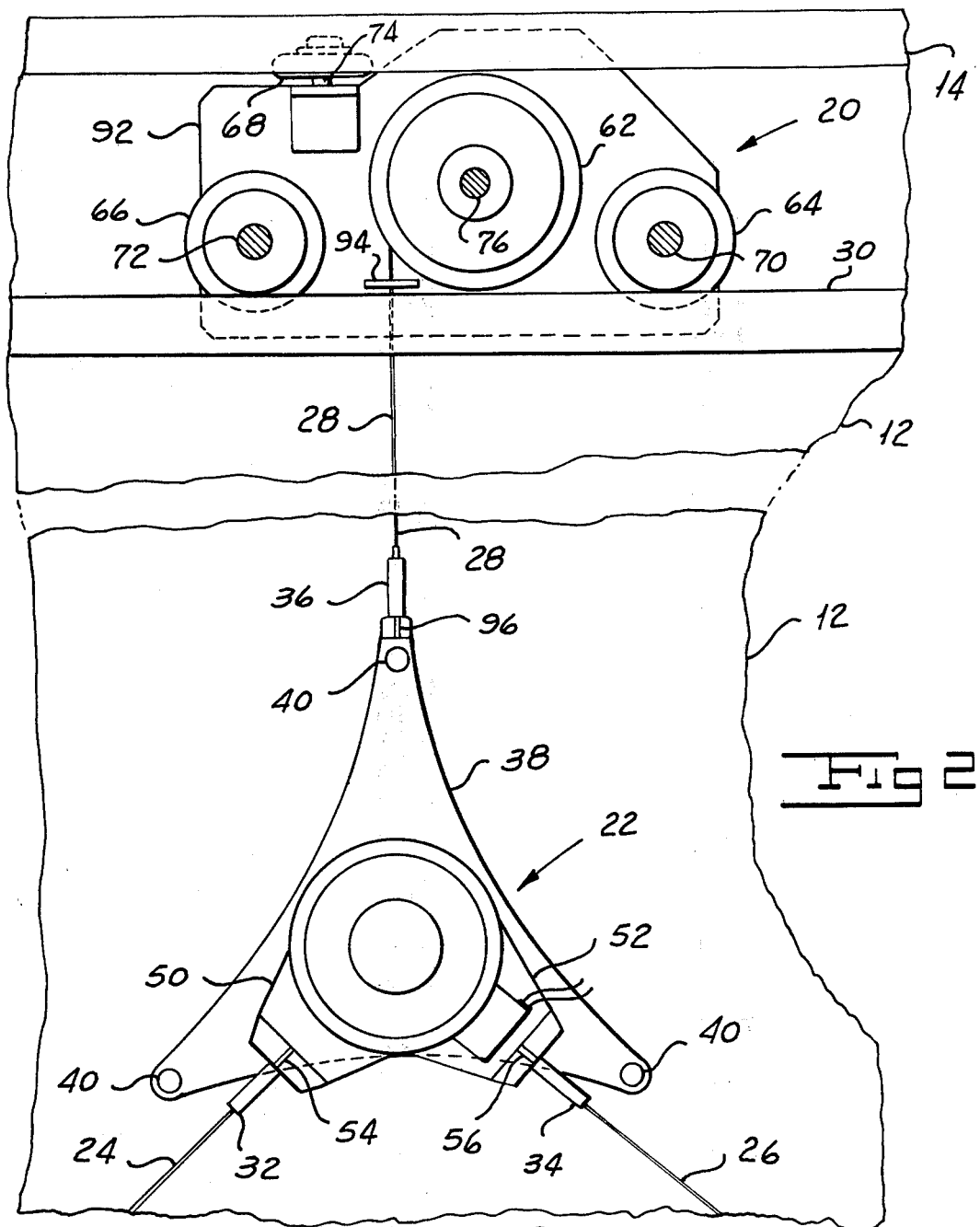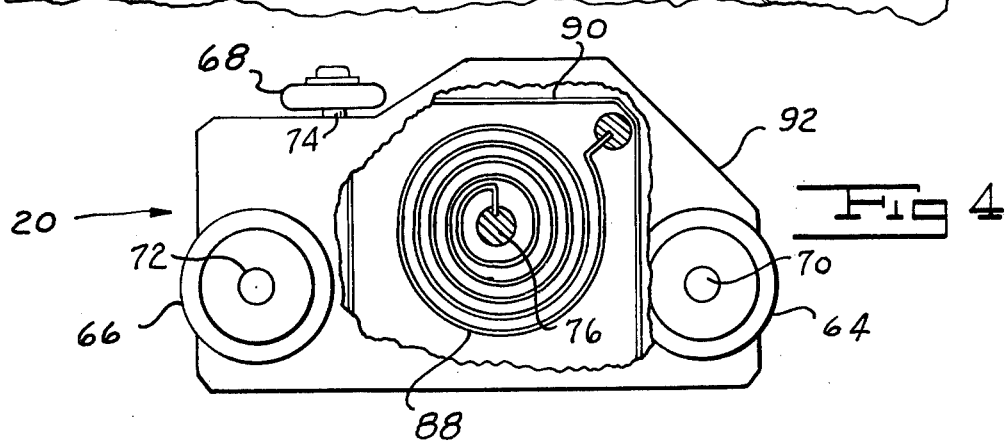

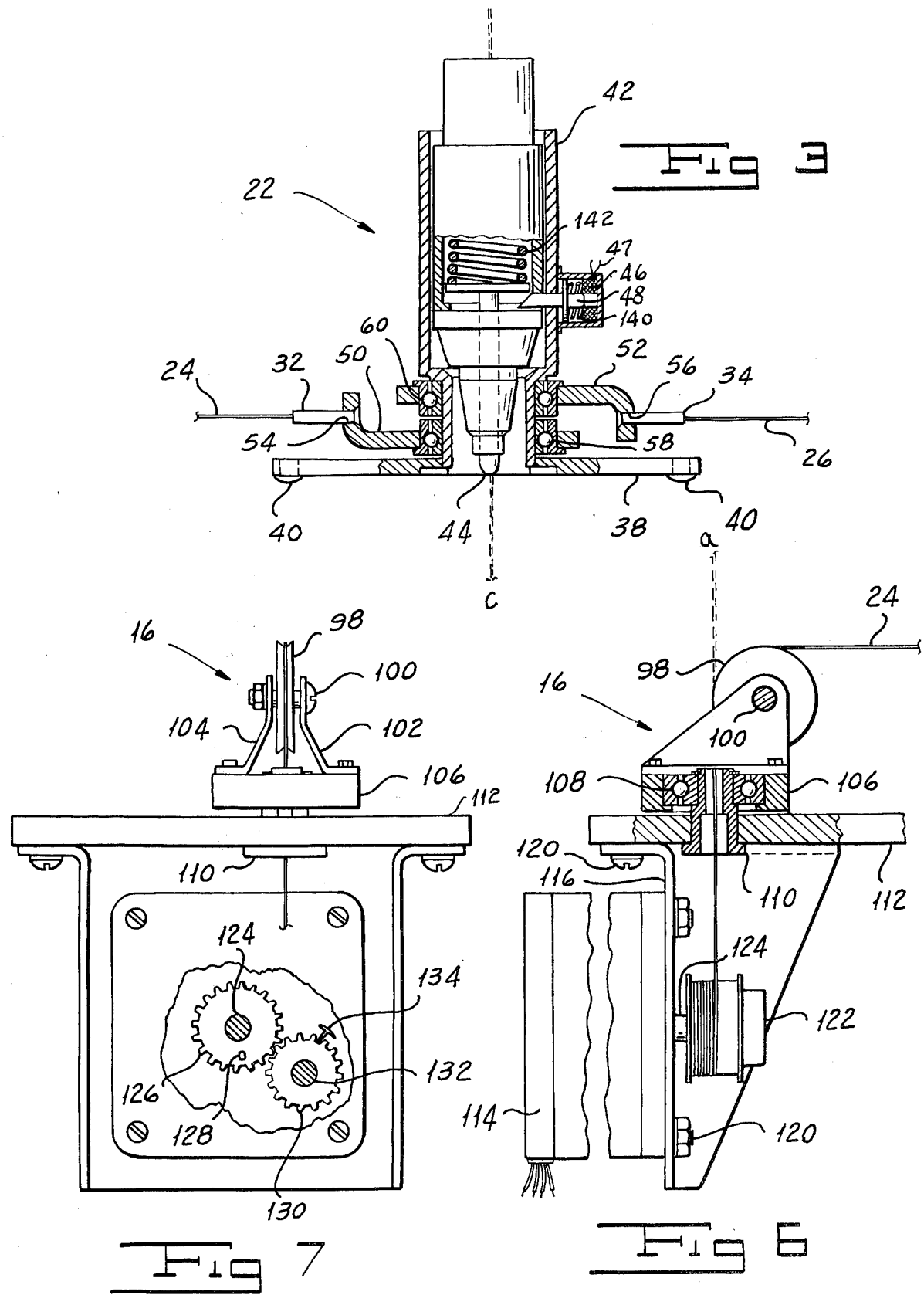

CABLE DRIVEN PLOTTER

FIELD OF THE INVENTION

My invention relates to plotting devices and more particularly to a cable driven plotting device which is adapted to operate on surfaces of varying areas.

BACKGROUND OF THE INVENTION

Most plotters of the prior art have some form of X and Y tracking mechanism which transports a carriage or marker along orthogonal axes to a desired point on a plotting surface. The tracking mechanism is usually a rigid structure which encloses the plotting surface, thus making the maximum area of the plotting surface dependent upon the size of the tracking mechanism. One such plotter, for example, is disclosed in Neasham U.S. Pat. No. 3,355,730 issued Nov. 28, 1967 in which the tracking mechanism consists of a pair of elongated precision lead screws mounted at right angles to each other along the length and width of a plotting surface. The lead screws are rotatably driven by respective motors, and each have a parallel guide rod mounted along the opposite boundary of the plotting surface. A pair of perpendicular wires, representing the X and Y coordinates are each suspended between a lead screw and a guide rod. By rotating the lead screws, the positions of the wires are changed to correspond to respective X and Y data. The intersection of the two wires mark the desired point.

The plotters embodying a major disadvantage stemming from the use of the rigid X and Y tracking mechanisms, in that any increase in the area of the plotting surface must be accompanied by an increase in the overall dimensions, precision, weight, and size of the tracking mechanism. In Neasham, for example, any increase in the area of the plotting surface requires the use of longer and heavier lead screws and guide arms, which in turn require larger and heavier motors consuming more power. As a result, the price of these devices bears a direct linear relationship to the area of the plotting surface.

Alternate types of plotters have been suggested. These plotters are based upon triangular coordinates in which an unknown point is represented by the intersection of two radii originating from two known separated fixed points. One such plotting device is disclosed in the Huckabay et al U.S. Pat. No. 3,184,740 issued May 18, 1965 in which a pair of telescoping arms are each pivotally connected at respective ends to fixed separated points. The other respective ends are pivotally interconnected. A light is mounted at the point of interconnection to illuminate the desired point on the plotting surface. A similar device is disclosed in Birrell U.S. Pat. No. 3,230,622 issued Jan. 25, 1966, except that a pair of elongated lead screws is used instead of telescoping arms. As these triangular coordinate plotters also utilize a rigid tracking mechanism, they suffer from the same disadvantages as the X and Y plotters.

Linn U.S. Pat. No. 3,564,533 issued Feb. 16, 1971 for a triangular graphic digitizer, shows a device used to obtain the relative positions of points on a graphic image. In the arrangement disclosed, one of the ends of each of two cables are pivotally connected to a common handpiece. Each cable then passes over a corresponding pulley, mounted to swivel on an axis perpendicular to the plane containing the graphic image, and is wound around a respective encoder to which the opposite ends are affixed. As an operator moves the handpiece over the points in a graphic image, the changes in the lengths of the cables are recognized by the encoders and recorded. Linn performs a function opposite to that of a plotter. A plotter uses information to create a graphic image while Linn obtains information from a graphic image. No means are disclosed in Linn for using the digitizer as a plotting device. In fact, the arrangement disclosed in Linn could not operate as a plotter, in that the handpiece (considered as a marking device) will not retain its orientation unless held in place by the operator. No means are supplied for supporting the handpiece as it moves over the graphic image.

DESCRIPTION OF THE PRIOR ART

The prior art which comprises the following patents has been described above: Neasham U.S. Pat. No. 3,355,730 issued Nov. 28, 1967; Huckabay et al U.S. Pat. No. 3,184,740 issued May 18, 1965; Birrell U.S. Pat. No. 3,230,622 issued Jan. 25, 1966; Linn U.S. Pat. No. 3,564,533 issued Feb. 16, 1971.

OBJECTS OF THE INVENTION

One object of my invention is to provide a cable driven plotting device which overcomes the defects of the prior art.

Another object of my invention is to provide a cable driven plotting device in which the area of the plotting surface is not dependent upon the size of the tracking mechanism.

Still another object of my invention is to provide a cable driven plotting device in which the basis components can be readily adjusted for use on plotting surfaces of varying areas.

A further object of my invention is to provide a cable driven plotting device which is relatively inexpensive in construction and which at the same time affords a high level of precision and speed.

A still further object of my invention is to provide a cable driven plotting device which is relatively simple in operation.

Other and further objects of my invention will appear from the following description.

BRIEF DESCRIPTION OF THE DRAWINGS

In the accompanying drawings which form part of the instant specification and which are to be read in conjunction therewith and in which like parts are indicated by like reference characters in various views;

FIG. 2 is a fragmentary plan view of the carriage and marking device of my plotter with parts broken away and shown in section.

FIG. 3 is a sectional elevation of the marking device of my plotter drawn on an enlarged scale, taken along the line 3—3 of FIG. 1.

FIG. 4 is a plan view of the carriage of my plotter with parts removed and parts broken away.

FIG. 6 is a fragmentary elevation of the first cable supply station of my plotter drawn on an enlarged scale with parts shown in section, taken along the line 6—6 of FIG. 1.

FIG. 7 is a fragmentary elevation of the first cable supply station of my plotter drawn on an enlarged scale with parts removed, broken away and shown in section, taken along the line 7—7 of FIG. 1.

DESCRIPTION OF THE PREFERRED EMBODIMENT

Figure 1:
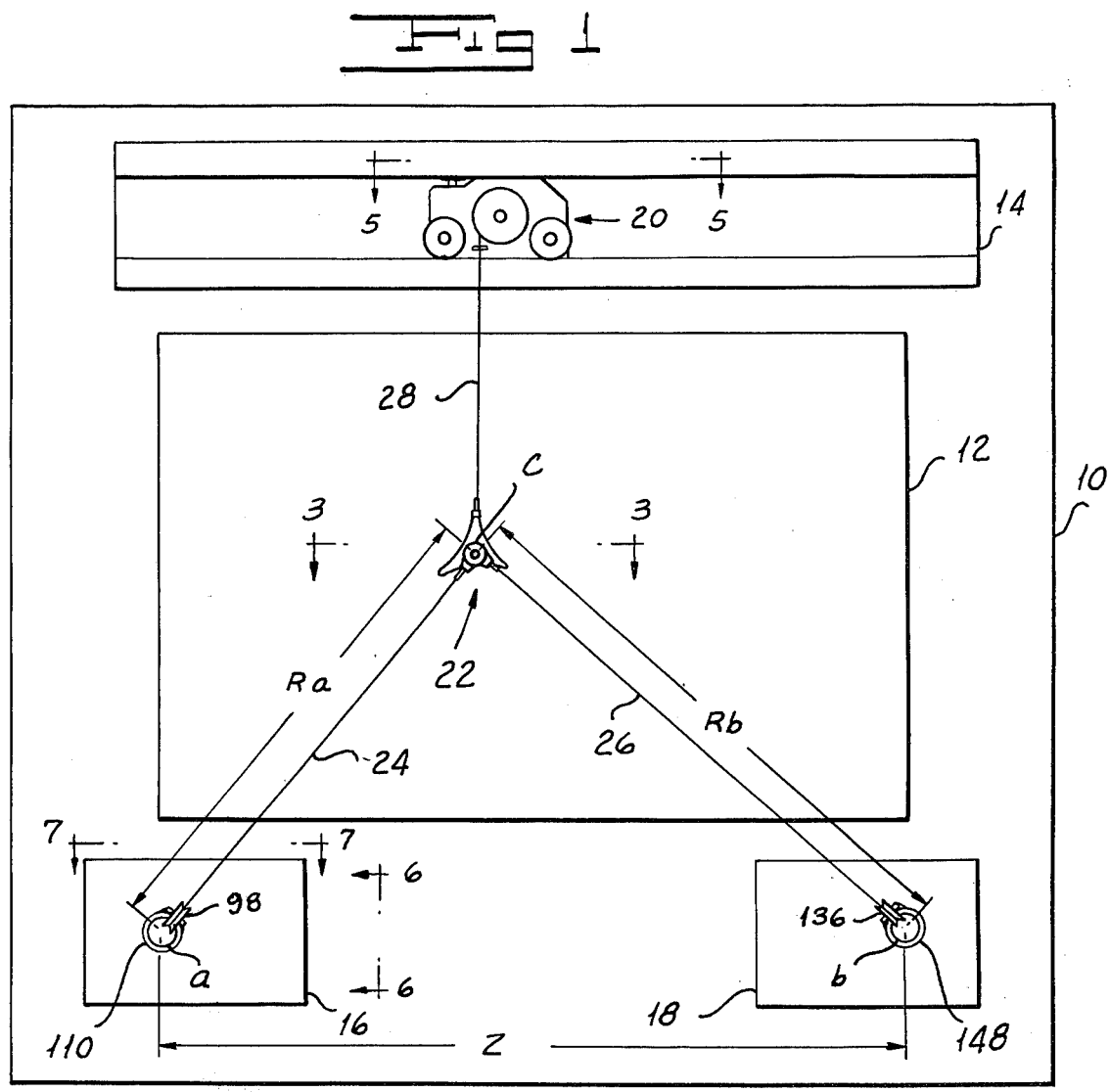
FIG. 1 is a plan view of my cable driven plotting device.

Referring now to FIG. 1 of the drawings, my cable driven plotting device includes a support 10 such as a table, stand or wall, supporting a plotting surface 12, over which a marking device indicated generally by reference numeral 22 is adapted to move in a manner to be more fully described hereinbelow. The marking device is suspended between a horizontally extending track 14, mounted above the upper edge of the plotting surface and two cable supply stations 16 and 18 mounted a fixed distance z apart, below the lower edge of the surface 12. Stations 16 and 18 carry respective guide pulleys 98 and 136 adapted to rotate on respective axes a and b, extending vertically through the center of respective shafts 110 and 148, and track 14 supports a carriage 20 adapted to move freely along the track 14.

Reffering now to FIGS. 2 and 3, the marking device indicated generally by the reference character 22, includes a triangular support plate 38, formed with a cylindrical housing 42 extending vertically through its center. The support plate 38 carries roller bearings 40 enabling the marking device to rest upon and glide along the plotting surface 12. The cylindrical housing 42 is adapted to carry a pen 44 or other marking means. A solenoid 46 mounted on the housing 42 has an armature 48 which is normally forced into the housing 42 by a spring 140, preventing the tip of the pen 44 from touching the plotting surface 12. By energizing the solenoid 46 the armature 48 is pulled out of the housing 42 allowing the pen 44 to touch the plotting surface 12. A second spring 142, located within the cylindrical housing 42 together with the weight of the pen 44 ensure contact of the pen with the medium on which the plot is to be made. The solenoid 46 is energized through conductors 47.

I connect one end of each of the cables 24 and 26 to respective sleeves 32 and 34. The sleeves 32 and 34 are removably carried by respective rings 50 and 52 in slots 54 and 56. The rings 50 and 52 are supported in bearings 58 and 60, carried by the housing 42 for rotation on an axis c. Axis c extends vertically through the center of the pen 44 and is the projected point of intersection of the two cables 24 and 26.

I connect one end of the cable 28 to a sleeve 36 removably carried by the support plate 38 in a slot 96. Cable 28 serves to tension both the cables 32 and 34 and to support the marking device 22 as will be explained hereinbelow.

Figure 5:
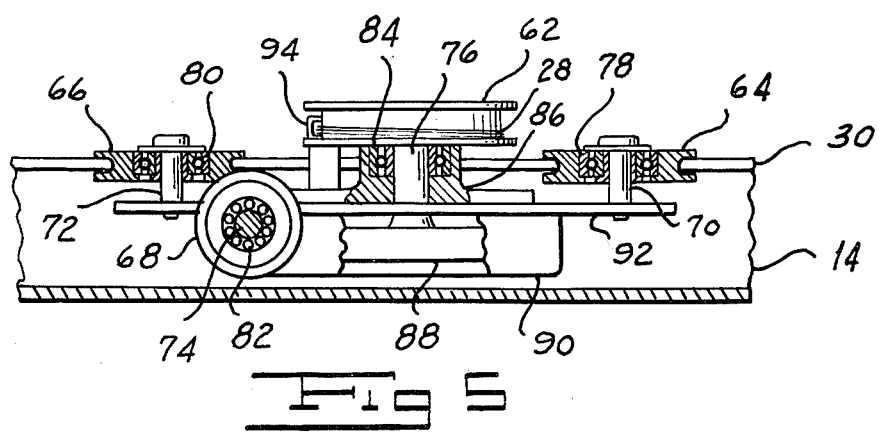
FIG. 5 is a fragmentary sectional elevation of the track and carriage of my plotter drawn on an enlarged scale with parts broken away taken along the line 5—5 of FIG. 1.

Referring now to FIGS. 2, 4 and 5, the carriage indicated generally by the reference character 20, rides freely inside the track 14 supported by two wheels 64 and 66 which ride on the lower edge 30 of the track 14 and one wheel 68 which rides inside the track 14, rotating on an axis perpendicular to the rotation axis of the other two wheels. I mount the wheels 64, 66 and 68 for rotation on respective shafts 70, 72 and 74 by means of respective bearings 78, 80 and 82. The shafts 70, 72 and 74 are mounted by any suitable means on a generally rectangular support plate 92.

I place a flat spiral spring 88 in a housing 90 mounted on the support plate 92. I secure one end of the spring 88 to the housing 90 and the other end to a shaft 76 which carries the take-up reel 62 as can be seen in FIG. 5. The shaft 76 is journalled in a bearing 84 carried in a flanged housing 86, mounted on the support plate 92. I extend cable 28 from the marking device 22 through a slotted member 94 to the take-up reel 62, to which it is wound around with one end secured thereto. The slotted member 94, extending from the plate 92, allows the cable 28 to pass through it, while preventing the marking device 22 from being pulled off the plotting surface 12. The spring 88 through the take-up reel 62 supplies a constant pull on the cable 28, thus tensioning cables 24 and 26. Since the carriage 20 is movable along the track 14, tension is applied uniformly to both the cables 24 and 26 as the marking device 22 moves across the plotting surface 12.

Referring now to FIGS. 6 and 7, the first cable supply station indicated generally by the reference character 16, to which the second cable supply station 18 (FIG. 1) is substantially similar, includes a guide pulley 98 journalled around a shaft 100 carried by a pair of retaining clips 102 and 104. The retaining clip 102 and 104 are mounted on a bearing housing 106 which receives a bearing 108 for rotatably supporting the pulley 98 on a hollow shaft 110 carried by a support 112. The pulley 98 rotates on an axis A, which extends vertically through the center of the shaft 110. A stepping motor 114 connected to the underside of the support 112 by a bracket 116 and screws 120, drives a take-up reel 122 through a shaft 124. Cable 24 extends from the marking device 22 over the pulley 98 and through the hollow shaft 110 to the take-up reel 124 around which it is wound with its end connected thereto.

In order to prevent damage to the marking device 22 it is desirable to limit the take-up reel 122 to a maximum number of revolutions in either direction, thus limiting the amount of cable 24 which can be spooled out or reeled in. This maximum number M will vary depending on the length L and width W of the plotting surface and the circumference C' of the take-up reel, and is represented by the equation:

$$M = \frac{\sqrt{L^2 + W^2}}{C'}$$

To accomplish this result, I mount a first gear 126 having M+1 number of teeth and a pin 128, on the shaft 124 which drives the take-up reel 122. The first gear 126 drives a second gear 130 carried by an idler shaft 132, having M number of teeth and carrying a radial member 134. As the gears 126 and 130 rotate the radial 134 is adapted to engage the pin 128 and prevent further rotation of the first gear 126 in that particular direction, each time the gears repeat the same relative position. This occurs each time the take-up reel completes M number of consecutive revolutions in a particular direction, thus preventing excessive reel-in and spool-out of the cable 24. In FIG. 7, I have shown the first gear 126 with 20 teeth and the second gear 130 with 19 teeth. This corresponds to a plotting surface having a length of three feet and a width of two feet and a take-up reel with a circumference of approximately 2¼ inches.

Referring now to FIG. 1, any point of the plotting surface 12 can be described as the point of intersection of two radii Ra and Rb originating from known points a and b located a fixed distance z apart. While two such intersections will occur, only one will lie on the plotting surface 12. Cables 24 and 26 represent the two radii (Ra and Rb) and the center of the hollow shafts 110 and 148 represent points a and b. The projected point of intersection of the cables 24 and 26 in the axis c which extends vertically through the center of the pen 44. By changing the lengths of the cables 24 and 26 to correspond to the respective values Ra and Rb, the marking device is moved across the plotting surface 12, so that the axis c extends through the desired point. The pen 44 can then be lowered to mark the point. Stepping motors are used to vary the lengths of the cables 24 and 26. A computer, not shown, can be used to translate X and Y coordinates into values Ra and Rb, $$Ra = \sqrt{X^2 + Y^2}$$

$$Rb = \sqrt{(Z - X)^2 + Y^2}$$

and energize the motors accordingly.

The carriage 20 through cable 28 tensions cables 24 and 26 as the marking device 22 is moved across plotting surface 12, insuring that the cables 24 and 26 correctly represent the values Ra and Rb.

By just changing the relative positions of the individual components of my plotter, the marking device 22, the two cable supply stations 16 and 18 and the track 14, plotting surfaces of varying areas can be created. The only practical limitations on the potential size of the plotting surface are the length of the cables 24, 26 and 28 and the track 14. The marking device 22, being of little mass, is able to achieve high speeds easily and does not suffer a great loss of precision as the area of the plotting surface 12 increases.

It will be seen that I have accomplished the objects of my invention. I have provided a cable driven plotter, the basic components of which can be readily adjusted for use on plotting surfaces of varying areas. My plotter is relatively inexpensive in construction and simple in operation, while at the same time affording a high level of precision and speed.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore duly understood that my invention is not to be limited to the specific details shown and described.

Having thus described my invention, what I claim is:

1. A plotting device comprising a plotting surface, a pen adapted to move freely over the plotting surface, means for raising and lowering the pen into and out of contact with the plotting surface, a first and a second cable, means for connecting one end of each of the cables to the pen, means including a motor and cable supply means for varying the length of said first cable, means including a motor and cable supply means for varying the length of said second cable, a third cable connected at one end to said pen, a take-up reel to which the other end of said third cable is connected, resilient means for torquing the reel, a carriage mounted for movement along a boundary of the plotting surface, and means mounting the reel on the carriage.

2. Apparatus as in claim 1 wherein a projection of the three cables intersects at a point on the vertical axis of the pen.

3. A plotting device comprising a plotting surface, marking means adapted to move freely over said plotting surface, first and second cable means connected at respective ends to said marking means, means including a motor and cable supply means for varying the length of said first cable means, means including a motor and cable supply means for varying the length of said second cable means, third cable means connected at one end to said marking means, and means for maintaining the third cable means in tension.

4. A plotting device comprising a plotting surface, marking means adapted to move freely over said plotting surface, first and second cable means connected at respective ends to said marking means, means including a motor and cable supply means for varying the length of said first cable means, means including a motor and cable supply means for varying the length of said second cable means, third cable means connected at one end to said marking means, means including third cable supply means for permitting variation in the length of the third cable means and for maintaining the third cable means in tension, and means mounting said third cable supply means for movement along a boundary of said plotting surface.

5. A plotting device comprising a plotting surface, marking means adapted to move freely over said plotting surface, first and second cable means connected at respective ends to said marking means, means including a motor and cable supply means for varying the length of said first cable means, means including a motor and cable supply means for varying the length of said second cable means, third cable means connected at one end thereof to said marking means, a take-up reel to which the other end of said third cable means is connected, means for torquing said reel, a carriage mounted for movement along a boundary of the plotting surface, and means mounting the reel on the carriage.

* * * * *